United States Patent
Chattaway

(10) Patent No.: US 12,345,365 B2
(45) Date of Patent: Jul. 1, 2025

(54) ADJUSTABLE FLOW SPLITTER FOR DISTRIBUTION SYSTEMS

(71) Applicant: Kidde Graviner Limited, West Midlands (GB)

(72) Inventor: Adam Chattaway, Windsor (GB)

(73) Assignee: KIDDE GRAVINER LIMITED, Solihull (GB)

( * ) Notice: Subject to any disclaimer, the term of this patent is extended or adjusted under 35 U.S.C. 154(b) by 346 days.

(21) Appl. No.: 17/360,308

(22) Filed: Jun. 28, 2021

(65) Prior Publication Data
US 2021/0404491 A1    Dec. 30, 2021

(30) Foreign Application Priority Data
Jun. 30, 2020    (EP) ..................................... 20275114

(51) Int. Cl.
    *F16L 41/02*      (2006.01)
    *F15D 1/04*      (2006.01)
    *F16K 11/052*      (2006.01)
    *F16K 11/078*      (2006.01)
    *F28F 9/02*      (2006.01)

(52) U.S. Cl.
CPC .............. *F16L 41/023* (2013.01); *F15D 1/04* (2013.01); *F16K 11/052* (2013.01); *F16K 11/0785* (2013.01); *F16L 41/021* (2013.01); *F28F 9/0275* (2013.01)

(58) Field of Classification Search
CPC .................. F16L 41/023; F16L 41/021; Y10T 137/87812; F16K 11/052; F16K 11/0785; F28F 9/0275
See application file for complete search history.

(56) References Cited

U.S. PATENT DOCUMENTS

| | | | |
|---|---|---|---|
| 797,253 A | 8/1905 | Banister | |
| 1,553,953 A * | 9/1925 | O'Brien | ............... E03B 9/02 137/299 |
| 1,621,022 A | 3/1927 | Merchen | |
| 3,080,884 A | 3/1963 | Nelson et al. | |
| 3,695,291 A * | 10/1972 | Sims | ............. D06F 39/08 68/902 |
| 5,165,450 A | 11/1992 | Marrelli | |
| 6,056,001 A | 5/2000 | Boyles et al. | |
| 7,896,170 B2 | 3/2011 | Bjerkreim et al. | |
| 2018/0230945 A1 | 8/2018 | Romano et al. | |

OTHER PUBLICATIONS

Extended European Search Report for International Application No. 20275114.5 dated Jan. 13, 2021, 9 pages.

* cited by examiner

*Primary Examiner* — Atif H Chaudry
(74) *Attorney, Agent, or Firm* — CANTOR COLBURN LLP

(57) ABSTRACT

An adjustable flow splitter for a distribution system, the adjustable flow splitter comprises an inlet channel for receiving fluid at a first end, the inlet channel configured to allow flow from the first end to a second end. The adjustable flow splitter also comprises a first sub-channel and a second sub-channel located at the second end, and a diverter configured to deflect the flow of the fluid from the inlet channel to at least one of the first sub-channel and/or the second sub-channel, wherein the diverter is adjustable. The adjustable flow splitter also comprises means for maintaining the position of the diverter.

11 Claims, 5 Drawing Sheets

ADJUSTABLE FLOW SPLITTER FOR DISTRIBUTION SYSTEMS

CROSS-REFERENCE TO RELATED APPLICATIONS

This application claims priority to European Patent Application No. 20275114.5 filed Jun. 30, 2020, the entire contents of which is incorporated herein by reference.

TECHNICAL FIELD

The present disclosure relates to an adjustable splitter for distribution systems. In particular, the present disclosure relates to an adjustable splitter for distribution systems of chemical agents in aircraft.

BACKGROUND OF THE DISCLOSURE

Distributing dry chemical agents such as Kidde Suppression Agent (KSA™) a finely divided sodium bicarbonate aerosol, in complex, cluttered environments, such as engine nacelles and/or Auxiliary Power Units (APUs) is both challenging and necessary to achieve the required certification criteria. Getting the correct quantity of agent to each nozzle is part of this challenge. Typically nozzle orifices or pipe diameters are adjusted to achieve the correct mass flow. This is time consuming and quantised (i.e. only certain pipe diameters are available).

SUMMARY OF THE INVENTION

In the present disclosure, there is provided an adjustable flow splitter for a distribution system, the adjustable flow splitter comprises an inlet channel for receiving fluid at a first end, the inlet channel configured to allow flow from the first end to a second end. The adjustable flow splitter also comprises a first sub-channel and a second sub-channel located at the second end, and a diverter configured to deflect the flow of the fluid from the inlet channel to at least one of the first sub-channel and/or the second sub-channel, wherein the diverter is adjustable. The adjustable flow splitter also comprises means for maintaining the position of the diverter.

Preferably, the means for maintaining the position of the diverter may be a set screw.

Further, the first sub-channel and the second sub-channel may be configured in a Y-shape configuration. Alternatively, the first sub-channel and the second sub-channel may be arranged in a T-shape configuration.

Preferably, the inlet channel may have a first wall and a second wall, and wherein there is provided a first diameter between the first wall and the diverter, and wherein there is provided a second diameter ($d_2$) between the second wall and the diverter, wherein the diverter is adjusted to increase and/or decrease the first diameter and/or the second diameter. Preferably, the first diameter may be equal to the second diameter; or the first diameter may be greater than the second diameter; or the first diameter may be less than the second diameter.

The set screw may include a first end, a second end, a shaft, a first retaining nut, and a second retaining nut. The diverter may be sandwiched between the first retaining nut and the second retaining nut such that when the first end or the second end are rotated, in use, to rotate the shaft, the first retaining nut and the second retaining nut are configured to move the diverter along the shaft.

There is also provided a distribution system comprising the adjustable flow splitter as described above.

There is also provided a method, comprising providing an inlet channel for receiving fluid at a first end, wherein the inlet channel allows flow from the first end to a second end. The method also comprises providing a first sub-channel and a second sub-channel at the second end; and deflecting the flow of the fluid from the inlet channel to at least one of the first sub-channel and/or the second sub-channel with a diverter, wherein the diverter is adjustable. The method also comprises maintaining the position of the diverter.

The step of maintaining the position of the diverter may be performed with a set screw.

Preferably, the first sub-channel and the second sub-channel may be configured in a Y-shape configuration. Alternatively, the first sub-channel and the second sub-channel may be arranged in a T-shape configuration.

Preferably, the inlet channel has a first wall and a second wall. Further, the method preferably provides a first diameter between the first wall and the diverter, and provides a second diameter between the second wall and the diverter; and adjusts the diverter to increase and/or decrease the first diameter and/or the second diameter. Preferably, the first diameter is equal to the second diameter; or the first diameter is greater than the second diameter; or the first diameter is less than the second diameter.

Preferably, the set screw may further comprise a first end, a second end, a shaft, a first retaining nut, and a second retaining nut, wherein the diverter may be sandwiched between the first retaining nut and the second retaining nut such that when the first end or the second end are rotated, in use, to rotate the shaft, the first retaining nut and the second retaining nut are configured to move the diverter along the shaft.

BRIEF DESCRIPTION OF THE DRAWINGS

FIG. 1 shows an overview of an adjustable flow splitter for distribution systems in accordance with the present disclosure.

FIG. 2 shows an alternative example of the adjustable flow splitter of FIG. 1.

FIG. 3 shows an overview of another example of an adjustable flow splitter for distribution systems in accordance with the present disclosure.

FIG. 4 shows an alternative example of the adjustable flow splitter of FIG. 3.

FIG. 5 shows an overview of a means for maintaining the position of a diverter that diverts flow through an adjustable flow splitter as shown in FIGS. 1 to 4.

DETAILED DESCRIPTION

Generally, an adjustable flow splitter for a distribution system is described. The adjustable flow splitter may be used in conjunction with distribution systems that are concerned with distributing chemical agents, such as KSA, through a number of channels.

Figure 1:
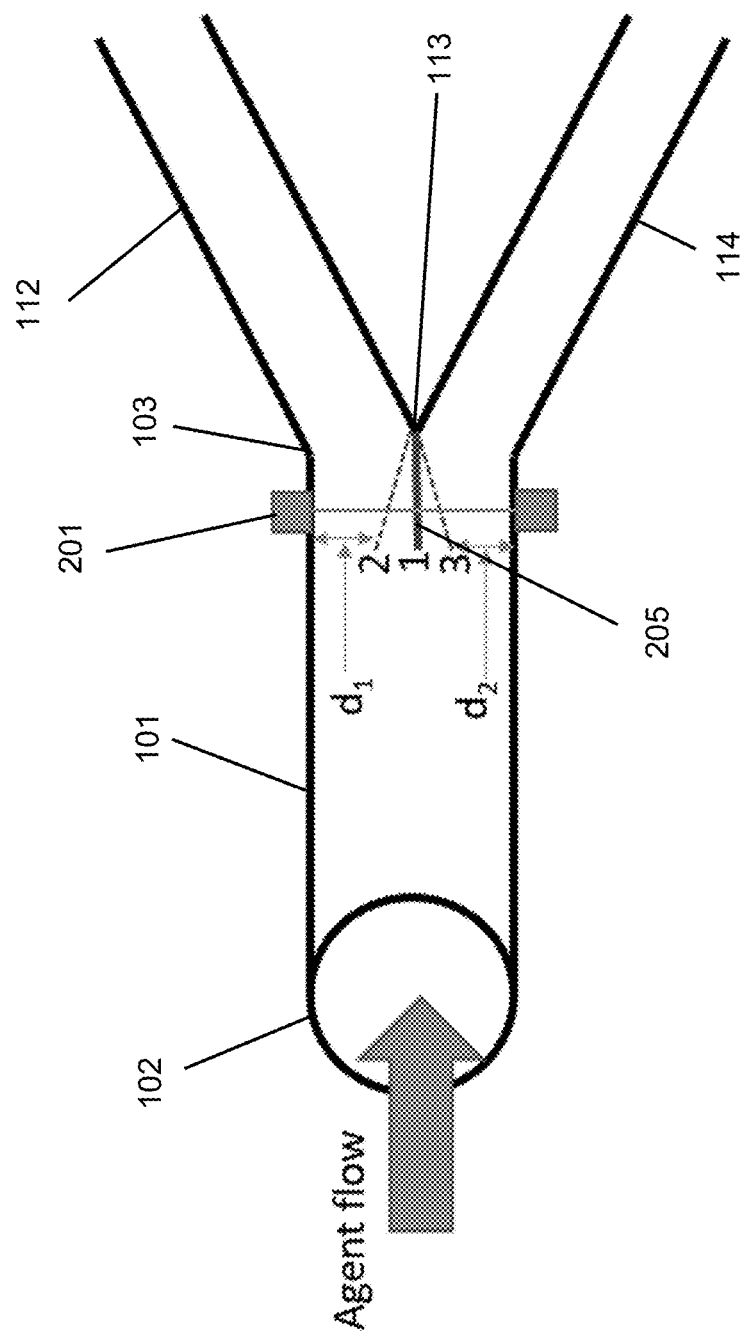

An example of an adjustable flow splitter is shown in FIG. 1. As shown in this Figure, the adjustable flow splitter may include an inlet channel 101 and, as an example, a first sub-channel 112 and a second sub-channel 114. The inlet channel 101 may include a first end 102 and a second end 103. It is envisaged that the chemical agent will be received at the first end 102 and flow along the inlet channel 101 to the second end 103 (e.g. in the direction of the arrow shown). In the example shown in FIG. 1, the inlet channel 101 may be a hollow cylindrical channel. However, other shapes of channels may be used.

At the second end of the inlet channel 101, the adjustable flow splitter may include the first sub-channel 112 and the second sub-channel 114. As an example shown in FIG. 1, the first sub-channel 112 and the second sub-channel 114 may provide a flow distribution as a Y-shaped junction. The chemical agent (not shown) is therefore able to move through the inlet channel 101 and through the first sub-channel 112 and the second sub-channel 114. At the point at which the first sub-channel 112 and the second sub-channel 114 meet, there may be provided a junction point 113 (i.e., the point at which the chemical agent is diverted to flow through the first sub-channel 112 and the second sub-channel 114).

Although a Y-shaped junction has been depicted in FIG. 1, it is also possible that a T-shaped junction may be used, as described below.

As can be seen in FIG. 1, there may also be provided a diverter 205 for diverting the flow of chemical agent through the first sub-channel 112 and the second sub-channel 114. In the example shown in FIG. 1, the diverter 205 extends from the junction towards the first end 102 of the adjustable flow splitter (i.e., away from the junction 113 parallel to the direction of flow of the chemical agent). As an example, the diverter 205 may comprise a blade, but of course other configurations may also be used.

The adjustable flow splitter of FIG. 1 may also include a set screw 201 for maintaining the position of the diverter 205. In the example shown in FIG. 1, the diverter 205 may pivot about the junction 113 to increase or decrease the diameters between the diverter 205 and the set screw 201. For example, as shown in FIG. 1, there may be provided a first diameter $d_1$ between the diverter 205 and the set screw 201, and there may be provided a second diameter $d_2$, on the opposite side of the diverter 205, between the diverter 205 and the set screw 201.

Three positions of the diverter 205 are shown, as an example, in FIG. 1. Position 1, where the diverter 205 is parallel to the flow of the chemical agent through the inlet channel 101 allows the first diameter $d_1$ to be equal to the second diameter $d_2$ (i.e., to provide even distribution through the first sub-channel 112 and the second sub-channel 114). Position 2, where the diverter 205 is moved towards the set screw 201 in the direction of the first diameter $d_1$ allows the first diameter $d_1$ to be less than the second diameter $d_2$ (i.e., to provide more chemical agent to pass through the second sub-channel 114 than through the first sub-channel 112). Position 3, where the diverter 205 is moved towards the set screw 201 in the direction of the second diameter $d_2$ allows the first diameter $d_1$ to be greater than the second diameter $d_2$ (i.e., to provide more chemical agent to pass through the first sub-channel 112 than through the second sub-channel 114).

In the distribution system, it may be necessary to alter the first diameter $d_1$ and the second diameter $d_2$ to predetermined values for the specific use to which the adjustable flow splitter is applied. As shown in FIG. 1, and as described above, the diverter 205 allows for these values to be altered so that the ratio of chemical agent travelling through the first sub-channel 112 and the second sub-channel 114 may be provided at a predetermined value. As envisaged in FIG. 1, once the diverter 205 has been moved into the predetermined position to allow for the ratio discussed above, the set screw 201 may then be adjusted so that the diverter 205 is maintained in that position. Therefore, this allows for the diverter 205 to be adjusted and set before use of the distribution system.

Figure 2:
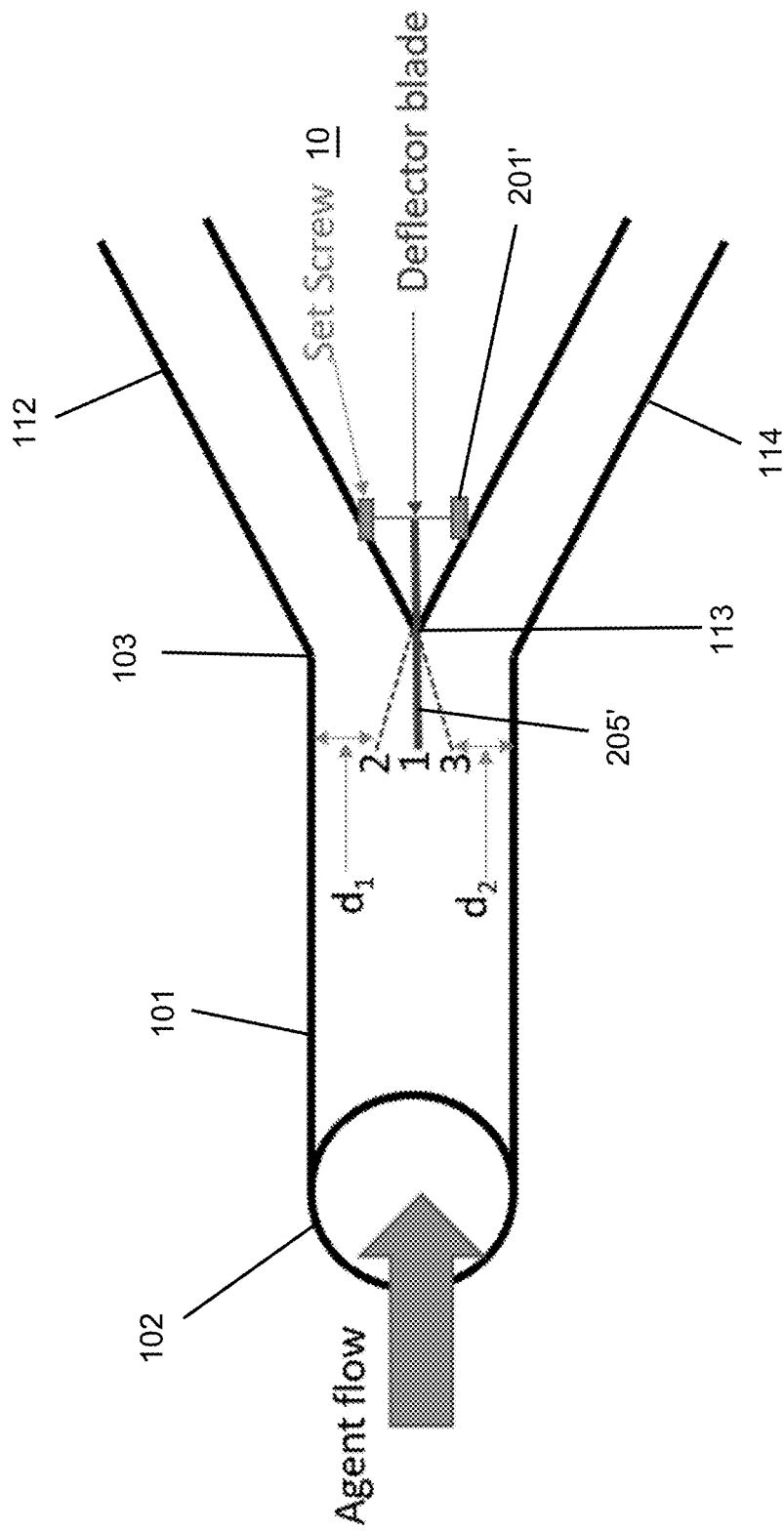

FIG. 2 shows an alternative example of the adjustable flow splitter described above in conjunction with FIG. 1. For ease of understanding, like-for-like reference numerals have been used in FIG. 2 to reference to same features that are shown in FIG. 1.

As shown in FIG. 2, the adjustable flow splitter may include an inlet channel 101 and, as an example, a first sub-channel 112 and a second sub-channel 114. The inlet channel 101 may include a first end 102 and a second end 103. It is envisaged that the chemical agent will be received at the first end 102 and flow along the inlet channel 101 to the second end 103 (e.g. in the direction of the arrow shown). In the example shown in FIG. 2, as with FIG. 1, the inlet channel 101 may be a hollow cylindrical channel. However, other shapes of channels may be used.

At the second end of the inlet channel 101, the adjustable flow splitter may include the first sub-channel 112 and the second sub-channel 114. As an example shown in FIG. 2, the first sub-channel 112 and the second sub-channel 114 may provide a flow distribution as a Y-shaped junction. The chemical agent (not shown) is therefore able to move through the inlet channel 101 and through the first sub-channel 112 and the second sub-channel 114. At the point at which the first sub-channel 112 and the second sub-channel 114 meet, there may be provided a junction point 113 (i.e., the point at which the chemical agent is diverted to flow through the first sub-channel 112 and the second sub-channel 114).

Although a Y-shaped junction has been depicted in FIG. 1, it is also possible that a T-shaped junction may be used, as described below.

As can be seen in FIG. 2, there may also be provided a diverter 205' for diverting the flow of chemical agent through the first sub-channel 112 and the second sub-channel 114. In the example shown in FIG. 2, the diverter 205' extends from the junction towards the first end 102 of the adjustable flow splitter (i.e., away from the junction 113 parallel to the direction of flow of the chemical agent), and extends from the junction point 113 to an external area 10, which is defined between the first sub-channel 112 and the second sub-channel 114. As an example, the diverter 205' may comprise a blade, but of course other configurations may also be used.

The adjustable flow splitter of FIG. 2 may also include a set screw 201' for maintaining the position of the diverter 205'. In the example shown in FIG. 2, the diverter 205' may pivot about the junction 113 to increase or decrease the diameters between the diverter 205 and the inlet channel 101 In the example shown in FIG. 2, the set screw 201' is provided in the external area 10 defined between the first sub-channel 112 and the second sub-channel 114. The set screw 201' may be adjusted to move the diverter 205' to alter the direction of flow of the chemical agent (not shown). For example, as shown in FIG. 2, there may be provided a first diameter $d_1$ between the diverter 205' and a first side of the inlet channel 101, and there may be provided a second diameter $d_2$, on the opposite side of the diverter 205', between the diverter 205' and a second side of the inlet channel 101.

Three positions of the diverter 205' are shown, as an example, in FIG. 2. Position 1, where the diverter 205' is parallel to the flow of the chemical agent through the inlet channel 101 allows the first diameter $d_1$ to be equal to the second diameter $d_2$ (i.e., to provide even distribution through the first sub-channel 112 and the second sub-channel 114). Position 2, where the diverter 205' is moved towards the first wall of the inlet channel 101 in the direction of the first diameter $d_1$ allows the first diameter $d_1$ to be less than the second diameter $d_2$ (i.e., to provide more chemical agent to pass through the second sub-channel 114 than through the first sub-channel 112). Position 3, where the diverter 205' is moved towards the second wall of the inlet channel 101 in the direction of the second diameter $d_2$ allows the first diameter $d_1$ to be greater than the second diameter $d_2$ (i.e., to provide more chemical agent to pass through the first sub-channel 112 than through the second sub-channel 114).

In the distribution system, it may be necessary to alter the first diameter $d_1$ and the second diameter $d_2$ to predetermined values for the specific use to which the adjustable flow splitter is applied. As shown in FIG. 2, and as described above, the diverter 205' allows for these values to be altered so that the ratio of chemical agent travelling through the first sub-channel 112 and the second sub-channel 114 may be provided at a predetermined value. As envisaged in FIG. 2, once the diverter 205' has been moved into the predetermined position to allow for the ratio discussed above, the set screw 201' may then be adjusted so that the diverter 205 is maintained in that position. Therefore, this allows for the diverter 205' to be adjusted and set before use of the distribution system.

Figure 3:
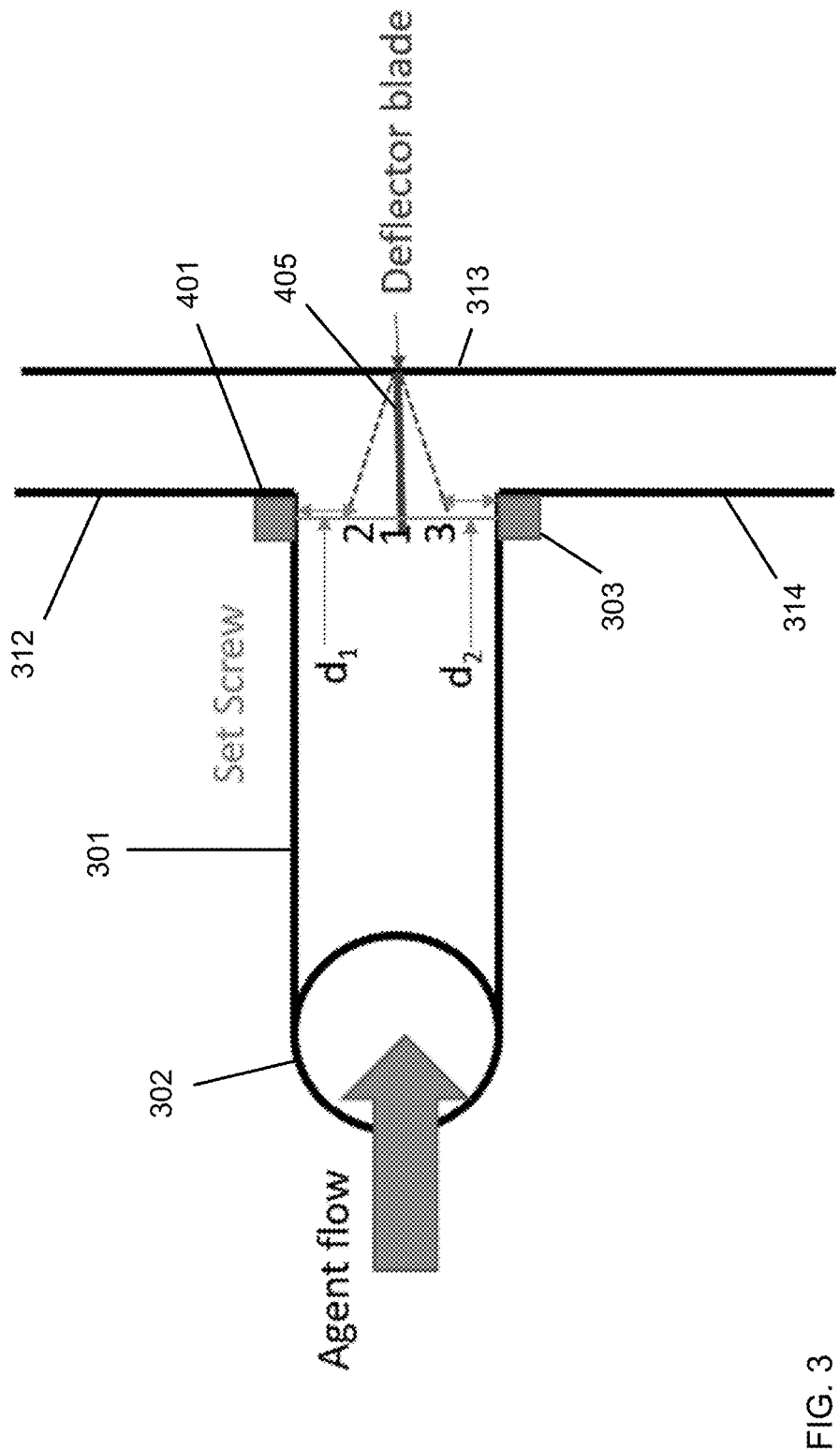

FIG. 3 shows an alternative example of an adjustable flow splitter. As shown in this Figure, the adjustable flow splitter may include an inlet channel 301 and, as an example, a first sub-channel 312 and a second sub-channel 314. The inlet channel 301 may include a first end 302 and a second end 303. It is envisaged that the chemical agent will be received at the first end 302 and flow along the inlet channel 301 to the second end 303 (e.g. in the direction of the arrow shown). In the example shown in FIG. 3, the inlet channel 301 may be a hollow cylindrical channel. However, other shapes of channels may be used.

At the second end of the inlet channel 301, the adjustable flow splitter may include the first sub-channel 312 and the second sub-channel 314. As an example shown in FIG. 3, the first sub-channel 312 and the second sub-channel 314 may provide a flow distribution as a T-shaped junction. The chemical agent (not shown) is therefore able to move through the inlet channel 301 and through the first sub-channel 312 and the second sub-channel 314. As is shown in FIG. 3, there is provided a sub-channel wall 313, which is perpendicular to the direction of flow—i.e., a wall which continuously extends from the first sub-channel 312 to the second sub-channel 314.

As can be seen in FIG. 3, there may also be provided a diverter 405 for diverting the flow of chemical agent through the first sub-channel 312 and the second sub-channel 314. In the example shown in FIG. 3, the diverter 405 extends from the sub-channel wall 313 towards the first end 102 of the adjustable flow splitter (i.e., away from the sub-channel wall 313 parallel to the direction of flow of the chemical agent). As an example, the diverter 405 may comprise a blade, but of course other configurations may also be used.

The adjustable flow splitter of FIG. 3 may also include a set screw 401 for maintaining the position of the diverter 405. In the example shown in FIG. 3, the diverter 405 may pivot about the sub-channel wall 313 to increase or decrease the diameters between the diverter 405 and the set screw 401. For example, as shown in FIG. 3, there may be provided a first diameter $d_1$ between the diverter 405 and the set screw 401, and there may be provided a second diameter $d_2$, on the opposite side of the diverter 405, between the diverter 405 and the set screw 401.

Three positions of the diverter 405 are shown, as an example, in FIG. 3. Position 1, where the diverter 405 is parallel to the flow of the chemical agent through the inlet channel 301 allows the first diameter $d_1$ to be equal to the second diameter $d_2$ (i.e., to provide even distribution through the first sub-channel 312 and the second sub-channel 314). Position 2, where the diverter 405 is moved towards the set screw 401 in the direction of the first diameter $d_1$ allows the first diameter $d_1$ to be less than the second diameter $d_2$ (i.e., to provide more chemical agent to pass through the second sub-channel 314 than through the first sub-channel 312). Position 3, where the diverter 405 is moved towards the set screw 401 in the direction of the second diameter $d_2$ allows the first diameter $d_1$ to be greater than the second diameter $d_2$ (i.e., to provide more chemical agent to pass through the first sub-channel 312 than through the second sub-channel 314).

In the distribution system, it may be necessary to alter the first diameter $d_1$ and the second diameter $d_2$ to predetermined values for the specific use to which the adjustable flow splitter is applied. As shown in FIG. 3, and as described above, the diverter 405 allows for these values to be altered so that the ratio of chemical agent travelling through the first sub-channel 312 and the second sub-channel 314 may be provided at a predetermined value. As envisaged in FIG. 3, once the diverter 405 has been moved into the predetermined position to allow for the ratio discussed above, the set screw 401 may then be adjusted so that the diverter 405 is maintained in that position. Therefore, this allows for the diverter 405 to be adjusted and set before use of the distribution system.

FIG. 4 shows an alternative example of the adjustable flow splitter described above in conjunction with FIG. 3. For ease of understanding, like-for-like reference numerals have been used in FIG. 4 to reference to same features that are shown in FIG. 3.

As shown FIG. 4, the adjustable flow splitter may include an inlet channel 301 and, as an example, a first sub-channel 312 and a second sub-channel 314. The inlet channel 301 may include a first end 302 and a second end 303. It is envisaged that the chemical agent will be received at the first end 302 and flow along the inlet channel 301 to the second end 303 (e.g. in the direction of the arrow shown). In the example shown in FIG. 4, the inlet channel 301 may be a hollow cylindrical channel. However, other shapes of channels may be used.

At the second end of the inlet channel 301, the adjustable flow splitter may include the first sub-channel 312 and the second sub-channel 314. As an example shown in FIG. 4, the first sub-channel 312 and the second sub-channel 314 may provide a flow distribution as a T-shaped junction. The chemical agent (not shown) is therefore able to move through the inlet channel 301 and through the first sub-channel 312 and the second sub-channel 314. As is shown in FIG. 4, there is provided a sub-channel wall 313, which is perpendicular to the direction of flow—i.e., a wall which continuously extends from the first sub-channel 312 to the second sub-channel 314.

As can be seen in FIG. 4, there may also be provided a diverter 405' for diverting the flow of chemical agent through the first sub-channel 312 and the second sub-channel 314. In the example shown in FIG. 4, the diverter 405' extends from the sub-channel wall 313 towards the first end 102 of the adjustable flow splitter (i.e., away from the sub-channel wall 313 parallel to the direction of flow of the chemical agent), and extends through the sub-channel wall 313 to an external area 30. The external area 30 is adjacent the sub-channel wall 313 and outside the fluid flow. The diverter 405' is configured to pivot at the sub-channel wall 313. As an example, the diverter 405' may comprise a blade, but of course other configurations may also be used.

Figure 4:
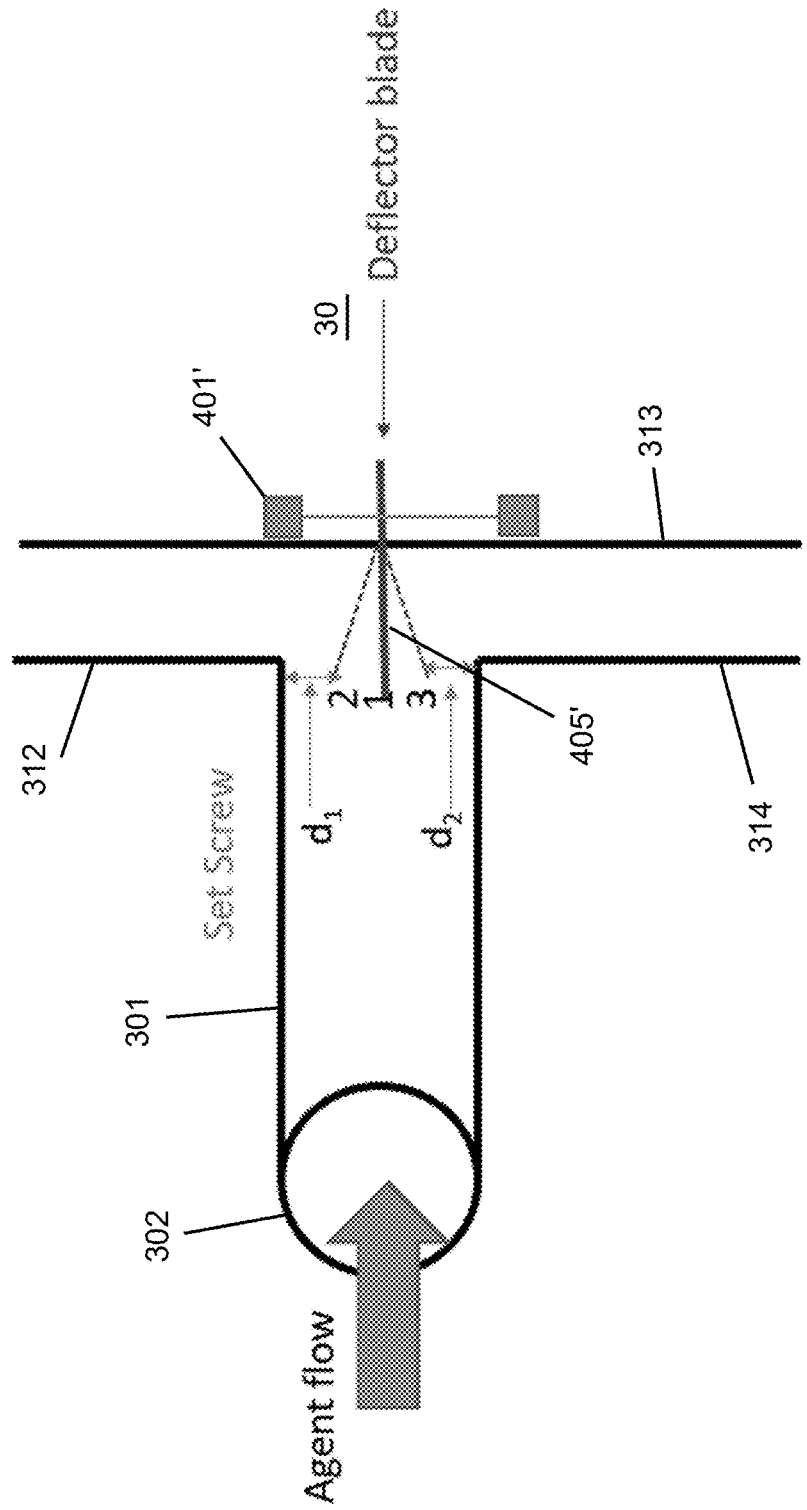
Figure 5:
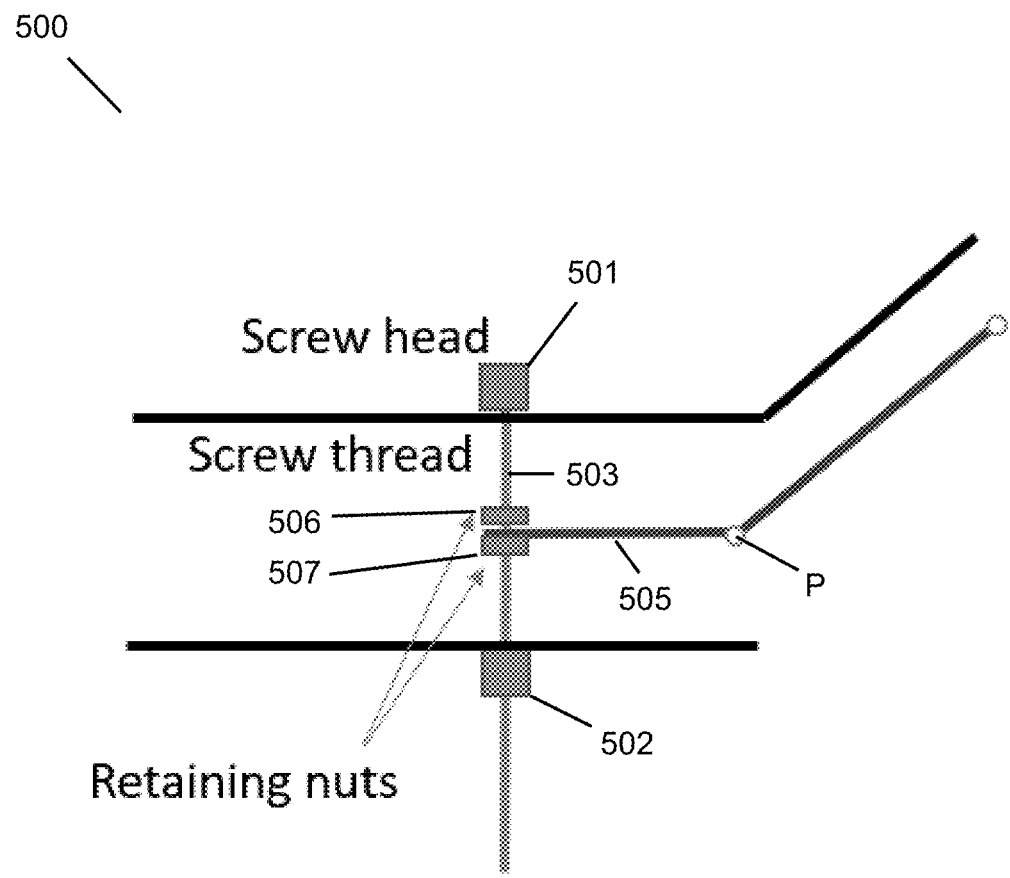

The adjustable flow splitter of FIG. 4 may also include a set screw 401' for maintaining the position of the diverter 405'. In the example shown in FIG. 4, the diverter 405' may pivot about the sub-channel wall 313 to increase or decrease the diameters between the diverter 405' and a first and/or second wall of the inlet channel 301. For example, as shown in FIG. 4, there may be provided a first diameter $d_1$ between the diverter 405' and a first wall of the inlet channel 301, and there may be provided a second diameter $d_2$, on the opposite side of the diverter 405', between the diverter 405' and a second wall of the inlet channel 301.

Three positions of the diverter 405' are shown, as an example, in FIG. 4. Position 1, where the diverter 405' is parallel to the flow of the chemical agent through the inlet channel 301 allows the first diameter $d_1$ to be equal to the second diameter $d_2$ (i.e., to provide even distribution through the first sub-channel 312 and the second sub-channel 314). Position 2, where the diverter 405' is moved towards the first wall of the inlet channel 301 in the direction of the first diameter $d_1$ allows the first diameter $d_1$ to be less than the second diameter $d_2$ (i.e., to provide more chemical agent to pass through the second sub-channel 314 than through the first sub-channel 312). Position 3, where the diverter 405' is moved towards the second wall of the inlet channel 301 in the direction of the second diameter $d_2$ allows the first diameter $d_1$ to be greater than the second diameter $d_2$ (i.e., to provide more chemical agent to pass through the first sub-channel 312 than through the second sub-channel 314).

In the distribution system, it may be necessary to alter the first diameter $d_1$ and the second diameter $d_2$ to predetermined values for the specific use to which the adjustable flow splitter is applied. As shown in FIG. 4, and as described above, the diverter 405' allows for these values to be altered so that the ratio of chemical agent travelling through the first sub-channel 312 and the second sub-channel 314 may be provided at a predetermined value. As envisaged in FIG. 4, once the diverter 405' has been moved into the predetermined position to allow for the ratio discussed above, the set screw 401' may then be adjusted so that the diverter 405 is maintained in that position. Therefore, this allows for the diverter 405' to be adjusted and set before use of the distribution system.

FIG. 5 shows an overview of the set screw 201, 201', 401 and 401' used in FIGS. 1 to 4. The set screw in FIG. 5 is denoted by the reference numeral 500, but it is intended to describe the set screws 201, 201', 401 and 401' depicted in FIGS. 1 to 4.

The set screw 500 includes a first end 501 (e.g. a first screw head) and a second end 502 (e.g. a second screw head). Extending between the first end 501 and the second end 502 is a shaft 503. As can be seen in FIG. 5, a diverter 505 (which corresponds to the diverters 205, 205', 405 and 405' shown in FIGS. 1 to 4) is positioned perpendicular to the shaft 503. On the shaft 503 may be provided a first retaining nut 506 and a second retaining nut 507, both fixed on either side of the diverter 505. When the user would like to adjust the position of the diverter 505, the user rotates either the first end 501 or the second end 502 such that the shaft 503 rotates. The rotation of the shaft 503 allows the first retaining nut 506 and the second retaining nut 507 to move axially along the shaft which causes the diverter 505 to move to the desired position, as described in conjunction with FIGS. 1 to 4 above. As shown in FIG. 5, there is an exemplary pivot point P provided. The set screw diverter 505 can, therefore, pivot about the pivot point P such that the flow can be altered by the diverter 505. It is, of course, envisaged that the set screw 500 described in FIG. 5 is also used in conjunction with the examples shown in FIGS. 2 and 4 where the diverter extends to the external areas 10 and 30. The pivot point P would then be arranged in the external areas 10 and 30.

Although the invention has been described in terms of preferred examples as set forth above, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. An adjustable flow splitter for a distribution system, the adjustable flow splitter comprising:
- an inlet channel for receiving fluid at a first end, the inlet channel configured to allow flow from the first end to a second end;
- a first sub-channel located at the second end;
- a second sub-channel located at the second end;
- an external area defined between the first sub-channel and the second sub-channel;
- a blade configured to deflect the flow of the fluid from the inlet channel to at least one of the first sub-channel and/or the second sub-channel, wherein the blade is adjustable, wherein the blade is located in the inlet channel and extends from the inlet channel into the external area and between the first and second sub-channels; and
- a set screw connected to the blade in the external area between the first and second sub-channels, wherein the set screw is configured to maintain the position of the blade.

2. The adjustable flow splitter of claim 1, wherein the first sub-channel and the second sub-channel are configured in a Y-shape configuration.

3. The adjustable flow splitter of claim 1,
- wherein the inlet channel has a first wall and a second wall,
- wherein there is provided a first diameter between the first wall and the diverter, and
- wherein there is provided a second diameter between the second wall and the diverter, wherein the diverter is adjusted to increase and/or decrease the first diameter and/or the second diameter.

4. The adjustable flow splitter of claim 3, wherein the first diameter is equal to the second diameter; or
- wherein the first diameter is greater than the second diameter; or
- wherein the first diameter is less than the second diameter.

5. The adjustable flow splitter of claim 1,
- wherein the set screw comprises a first end, a second end, a shaft, a first retaining nut, and a second retaining nut, and
- wherein the diverter is sandwiched between the first retaining nut and the second retaining nut such that when the first end or the second end are rotated, in use, to rotate the shaft, the first retaining nut and the second retaining nut are configured to move the diverter along the shaft.

6. A distribution system comprising:
- the adjustable flow splitter of claim 1.

7. A method for controlling flow in a distribution, the method comprising:
- providing an inlet channel for receiving fluid at a first end, wherein the inlet channel allows flow from the first end to a second end;
- providing a first sub-channel and a second sub-channel at the second end;
- providing an external area defined between the first sub-channel and the second sub-channel;
- deflecting the flow of the fluid from the inlet channel to at least one of the first sub-channel and/or the second sub-channel with a blade located in the inlet channel and extends from the inlet channel into the external area and between the first and second sub channels;
- maintaining the position of the blade with a set screw connected to the blade in the external area between the first and second sub-channels channels.

8. The method of claim 7, wherein the first sub-channel and the second sub-channel are configured in a Y-shape configuration.

9. The method of claim 7, wherein the inlet channel has a first wall and a second wall, the method further comprising:
- providing a first diameter between the first wall and the diverter, and providing a second diameter between the second wall and the diverter; and
- adjusting the diverter to increase or decrease the first diameter or the second diameter.

10. The method of claim 9, wherein the first diameter is equal to the second diameter; or
wherein the first diameter is greater than the second diameter; or
wherein the first diameter is less than the second diameter.

11. The method of claim 7, wherein the set screw comprises a first end, a second end, a shaft, a first retaining nut, and a second retaining nut, wherein the diverter is sandwiched between the first retaining nut and the second retaining nut such that when the first end or the second end are rotated, in use, to rotate the shaft, the first retaining nut and the second retaining nut are configured to move the diverter along the shaft.

* * * * *